United States Patent
Licari

[11] Patent Number: 6,062,397
[45] Date of Patent: May 16, 2000

[54] OVER-THE-SINK UTENSIL HOLDER AND STABILIZER

[76] Inventor: Yafa Licari, 875 Ocean Ave., Elberon, N.J. 07740

[21] Appl. No.: 09/217,319

[22] Filed: Dec. 21, 1998

Related U.S. Application Data

[60] Provisional application No. 60/068,771, Dec. 23, 1997.

[51] Int. Cl.[7] ............................................. A47G 19/08
[52] U.S. Cl. ........................................ 211/41.3; D32/55
[58] Field of Search ................................. 211/41.2, 41.3, 211/41.1, 70.7; D32/55–58; D7/601

[56] References Cited

U.S. PATENT DOCUMENTS

| | | | |
|---|---|---|---|
| D. 173,711 | 12/1954 | Roop | D32/55 |
| D. 181,366 | 11/1957 | Miller | 211/41.2 X |
| D. 206,257 | 11/1966 | Maurus | D32/55 |
| D. 215,170 | 9/1969 | Bachand | D32/55 |
| D. 217,633 | 5/1970 | Iorio | D32/55 |
| D. 254,529 | 3/1980 | Arnoff | D7/46 |
| D. 321,771 | 11/1991 | Cavicchia | D32/55 |
| D. 370,323 | 5/1996 | Lafond | D32/55 |
| 1,453,437 | 5/1923 | Burnham | 211/41.3 |
| 1,763,174 | 6/1930 | Morris | 211/41.3 X |
| 2,954,875 | 10/1960 | Becker | 211/41.3 |
| 4,169,638 | 10/1979 | Cirasuolo et al. | 211/41.2 |
| 5,485,927 | 1/1996 | Hubbard | 211/41.3 |
| 5,492,237 | 2/1996 | Chang | 211/41.3 X |
| 5,505,850 | 4/1996 | Licari | 210/464 |
| 5,547,087 | 8/1996 | Licari | 211/41.3 |
| 5,588,539 | 12/1996 | Belden, Jr. et al. | 211/41.3 |

*Primary Examiner*—Daniel P. Stodola
*Assistant Examiner*—Jennifer E. Novosad
*Attorney, Agent, or Firm*—Mathews, Collins, Shepherd & Gould, P.A.

[57] ABSTRACT

An apparatus for suspending utensils over a sink comprises a holding member coupled to a stabilizer. The holding member is configured to retain utensils, and the stabilizer comprises a hook member having a contact surface for engaging the back of a sink faucet. The holding member also has a support surface for resting against a side wall or top edge of the sink so that the stabilizer when engaged on the sink faucet in cooperation with the support surface and the force of gravity maintain the apparatus above the bottom surface of the sink. In this way, the holding member may suspend utensils such as kitchen implements including dish racks, flatware, containers, and cutting boards above the bottom surface of the sink.

12 Claims, 7 Drawing Sheets

OVER-THE-SINK UTENSIL HOLDER AND STABILIZER

Applicant claims priority based on U.S. application Ser. No. 60/068,771, filed Dec. 23, 1997.

FIELD OF THE INVENTION

The present invention relates to an apparatus for suspending utensils above the bottom surface of a sink. More particularly, the invention relates to a holding member coupled to a stabilizer, wherein the holding member may retain a plurality of utensils and the stabilizer suspends the holding member above the sink's bottom surface.

BACKGROUND OF THE INVENTION

Many kitchen utensils and implements are used in and around the sink. Flatware (e.g., silverware), dishes, glassware, pots, and pans are often rinsed or washed in the sink and allowed to dry on a dish rack placed next to the sink. Food may be chopped next to a sink, and remnants from the chopping may be placed into a garbage disposal within the sink. Also, food, e.g., fruits, vegetables, and pasta, may be rinsed or drained from a pot of water within the sink. Sometimes, dirty dishes are placed in the bottom of a sink to be rinsed or washed at a later time. In short, there are many occasions in which food and utensils are used in or around the sink. It would be advantageous to provide an apparatus for conserving sink and counter space in performing these tasks and to allow for performing these tasks away from the bottom surface of the sink. Often, dirty or unsavory items such as food remnants may be found at the bottom of the sink which one would like to keep away from utensils.

A colander item having a stabilizer for suspending the colander above the bottom surface of a sink is described in U.S. Pat. No. 5,505,850 issued Apr. 9, 1996 to Yaffa Licari, the inventor herein, titled "Colander and Stabilizer" (the '850 patent). The '850 patent relates to a colander witch is generally used for rinsing and straining foods. The invention of the '850 patent provides many advantages in terms of, among other things, conserving valuable sink space and distancing food from unsavory items at the sink bottom surface. However, the colander is configured to be used to rinse and strain items. It would be advantageous to provide an apparatus for suspending items above the sink bottom surface to be used for a variety of task or occasions which food and utensils may be used in or around the sink. This invention embraces a versatile over-the-sink kitchen utensil holder having a stabilizer providing these advantages. Further advantages may appear more fully upon considering the description given below.

SUMMARY OF THE INVENTION

Summarily described, the invention embraces an apparatus for suspending kitchen utensils above the bottom surface of a sink. The apparatus comprises a holding member for retaining a plurality of utensils having an upper rim and a stabilizer for suspending the holding member above the bottom of the sink. The stabilizer comprises a hook member that extends outwardly from the upper rim, and the hook member has an inner arcuate surface configured to engage the back of a sink faucet. The holding member further has a support surface for resting against the sink so that the stabilizer in cooperation with the support surface and the force of gravity may maintain the apparatus above the bottom surface of the sink. Multiple embodiments are contemplated, e.g., the holding member may comprise a shelf member with or without a hinge; it may comprise a frame configured to receive a cutting board, dish pan, or other utensil; or it may be configured to receive or define a plurality of items such as a dish rack, flatware container, or cutting board.

BRIEF DESCRIPTION OF THE DRAWINGS

For a better understanding of the invention and without limiting the scope thereof, an exemplary embodiment is described below, considered together with the accompanying drawings, in which.

It is to be understood that these drawings are for the purposes of illustrating the concepts of the invention and are not to scale.

DETAILED DESCRIPTION OF THE INVENTION

Figure 1:
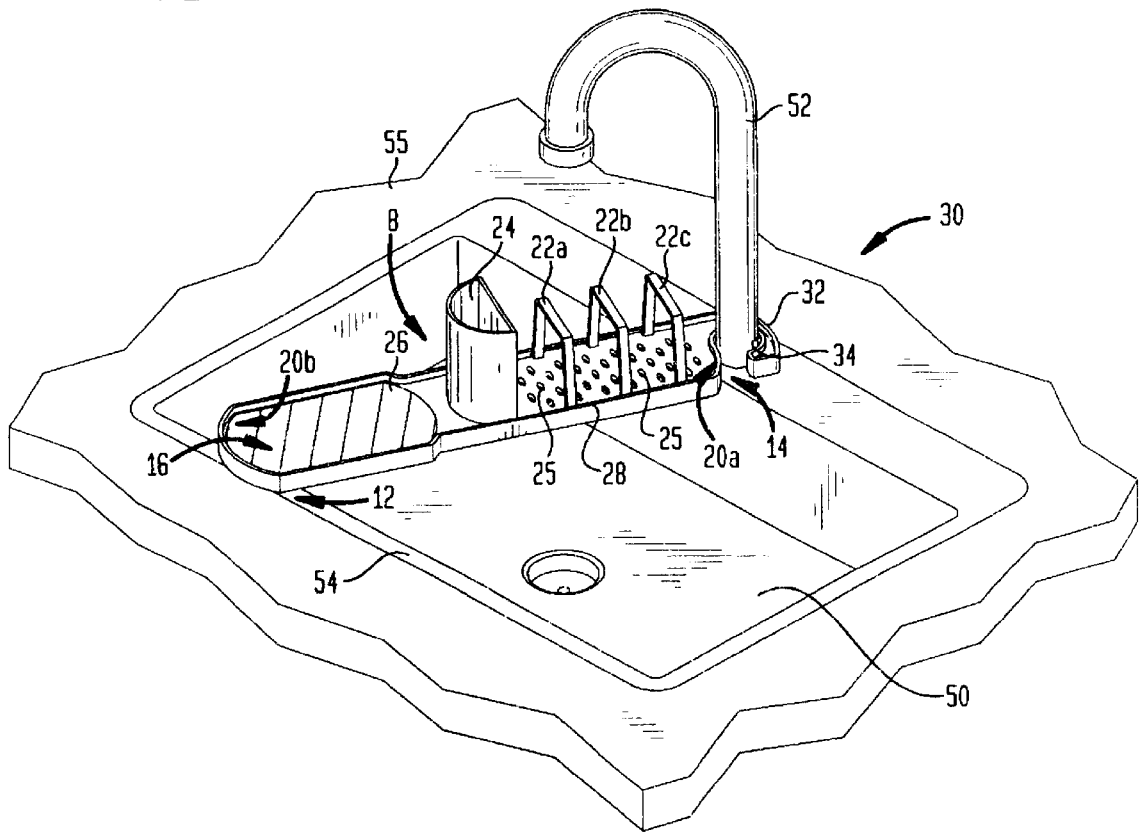
FIG. 1 is a perspective view of one embodiment of the inventive over-the-sink utensil holder with the holding member comprising a rectangular shelf member shown together with a sink.

Referring to FIG. 1, there is shown is a perspective view of one embodiment of the inventive apparatus 8 comprising a holding member 10 and a stabilizer 30 shown together with a sink 50. The holding member 10 is capable of retaining a plurality of utensils, implements, or food. The term "utensils" as used herein encompasses not only flatware but also any instrument or container used in or around the sink, including pots, pans, glassware, dishes, spoons and spatulas, graters, and other items that may be used in or around the sink.

The holding member 10 has a support surface 12 and at least one upper edge defining an upper rim 14. The stabilizer 30 comprises a hook member 32 extending from the upper rim 14, preferably in a plane substantially parallel with the upper rim. The hook member 32 has an inner arcuate surface 34 disposed in spaced-apart relation from the upper rim 14, with the inner arcuate surface of the hook member defining a faucet contact surface for engaging the back of a sink faucet 52.

In the embodiment shown in FIG. 1, the holding member 10 comprises a shelf member having a top surface 16, a bottom surface 18, and first and second ends 20a, 20b. The stabilizer 30 extends outwardly from one end 20a of the shelf member, and the support surface 12 is proximal the other end 20b. In the embodiment of FIG. 1, the support surface 12 comprises a portion of the bottom surface of the shelf member. With this embodiment, when the hook member 32 is disposed on the sink faucet as shown in FIG. 1, the support surface 12 rests against a top edge of the sink 54 or sink counter 55, suspending the holding member 10 above the surface of the sink, against the force of gravity. In this way, the stabilizer 30 may cooperate with the support surface 12 and the force of gravity to maintain the apparatus above the bottom surface 56 of the sink.

Figure 1A:
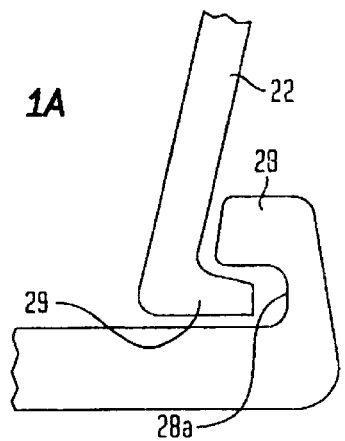
FIG. 1A is a cross-sectional cut-away view of the ridge along the periphery of the apparatus together with a portion of a kitchen implement.

This inventive utensil holder is versatile and in many ways a space-saver in that various kitchen implements may be disposed on or used with the holding member 10. For example, in FIG. 1, there is shown a plurality of substantially semi-circular projections 22a, 22b, 22c, extending upwardly from the top surface 16 of the holding member which define a dish rack. There also is shown disposed on the top surface 16 of the holding member a container 24 for holding flatware and a cutting board 26, shown with diagonal shading, for use in chopping foods. These implements may be removably disposed on the holding member or integrally formed within it. When removable, a ridge 28 may extend around all or part of the periphery of the apparatus 8 (as shown in FIG. 1), for holding the removable implements in place. For example, FIG. 1A shows a cut-away side view of the ridge 28 defining a recess 28a so that a corresponding extension 29 of a kitchen implement 22 may snap-fit into the ridge. Advantageously, the holding member 10 further has a plurality of apertures 25 extending through the top and bottom surfaces so that liquid, i.e., water from the sink faucet, can drip off the holding member into the sink below. The apertures also may be used to append implements to the holding member; for example, a flatware container may be coupled to the holding member by placing a hook on the container which may then snap or fit within one of the apertures 25.

Figure 1B:
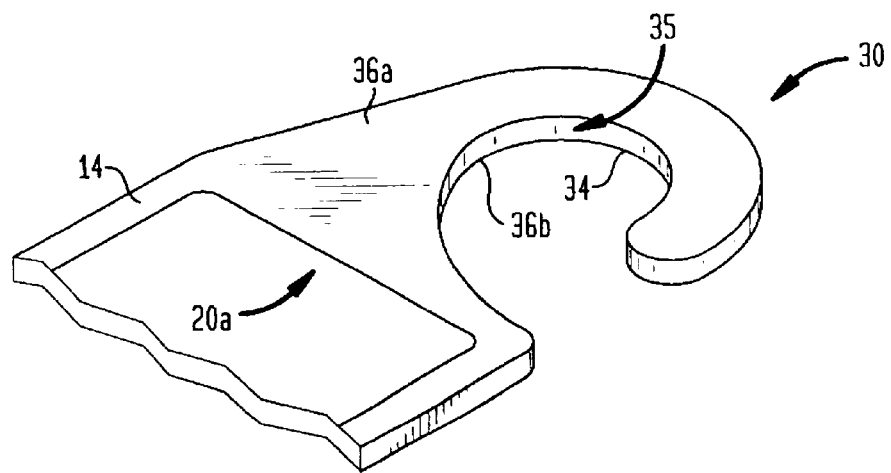
FIG. 1B is a perspective view of a section of an embodiment of the utensil holder showing the stabilizer extending from the middle of the upper rim.
Figure 1C:
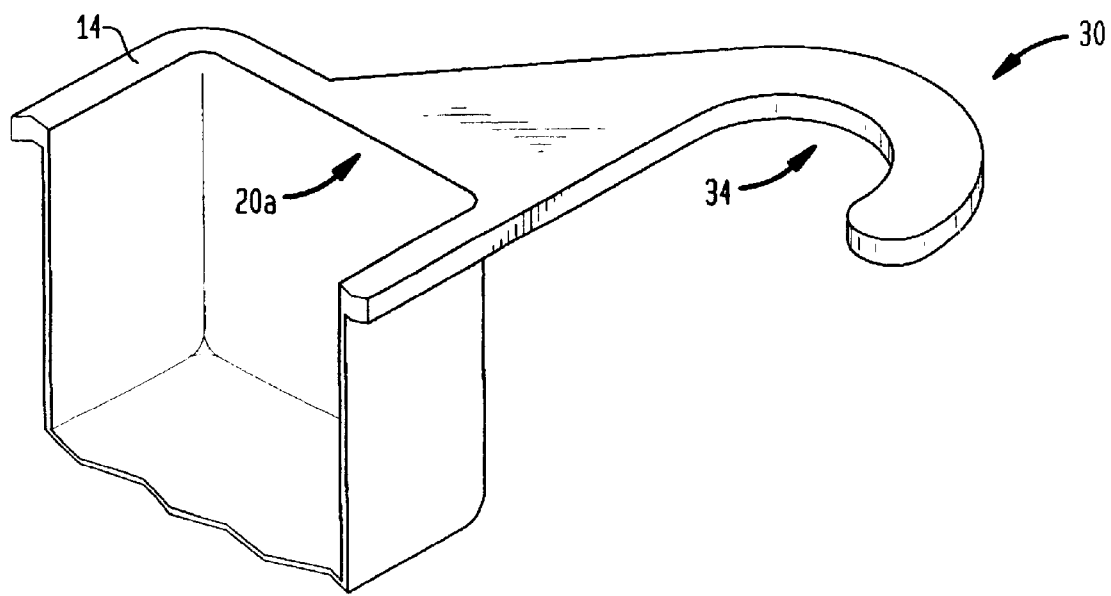
FIG. 1C is a perspective view of a section of an embodiment of the utensil holder showing the stabilizer extending from an end of the upper rim.

Referring to FIGS. 1B and 1C, there are illustrated cut-off sectional views of one embodiment of the utensil holder showing the stabilizer 30 extending from different locations of the rim 14 at one end 20a of the member. As can be seen from these figures, the inner arcuate surface 34 of the hook member may be spaced from the rim 14 so that its midpoint is aligned along an axis X that intersects the upper rim 14, as in FIG. 1B, or the midpoint of the arcuate surface may be aligned along an axis Y that does not intersect the upper rim, as in FIG. 1C. In both these embodiments the arcuate surface of the hook member is disposed in spaced-apart relation from the upper rim 14. Also as can be seen in these figures, the inner arcuate surface 34 may comprise a substantially vertical plane surface 35, as in FIG. 1B, but it need not be and may be curved or rounded, or it may be defined by the top 36a and bottom 36b of the hook member converging at one point.

Figure 2:
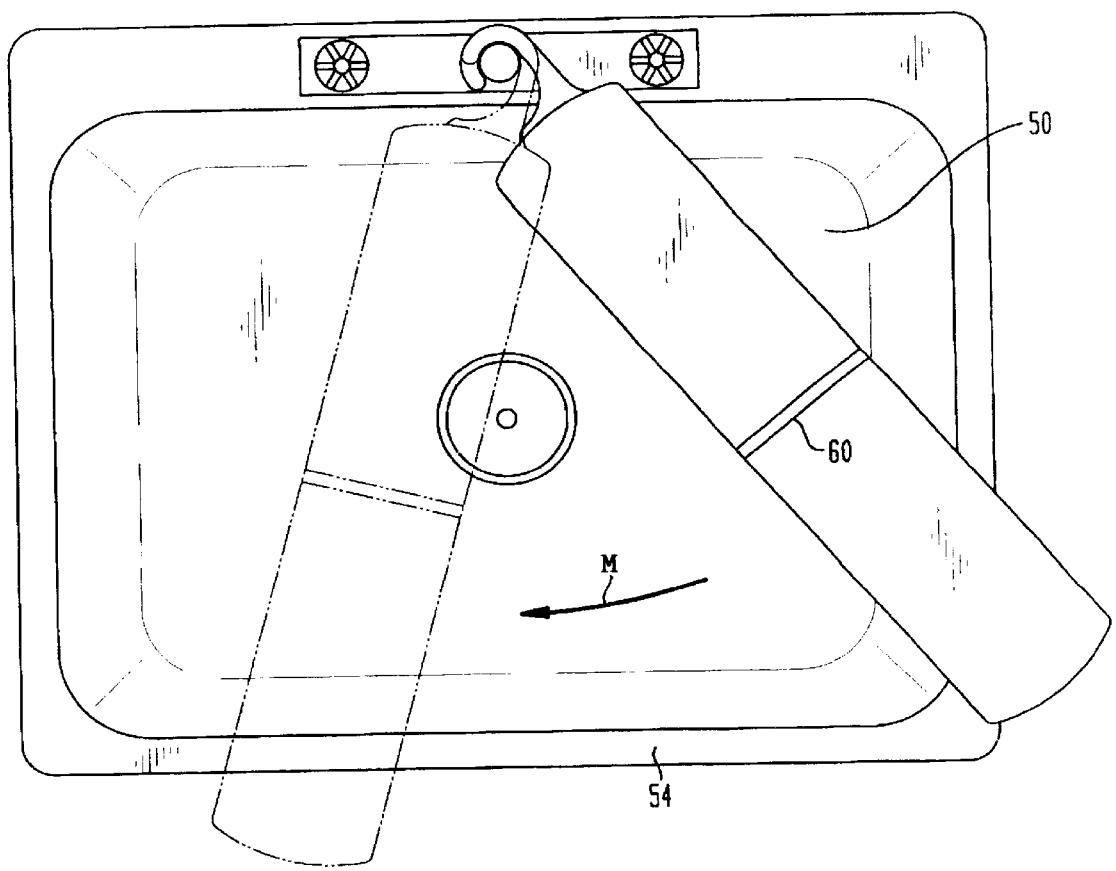
FIG. 2 is a top view of an embodiment of the utensil holder placed on a sink.

An advantage of the inventive utensil holder of FIG. 1 (wherein the holding member comprises a substantially flat shelf member), is further illustrated in FIG. 2. Looking at FIG. 2, the shelf member can be easily moved following the arrows m from one position above the sink to another (i.e., designated by the solid and hatched lines outlining the apparatus). In this way, different areas of the sink bottom (or space beneath the utensil holder), are made accessible. This is helpful since items such as dishes may be located under the utensil holder and one may wish to access those items without having to completely remove the utensil holder from the sink. A hinge 60 may be integrated in the shelf member 10 so that the apparatus can be reduced in size when not in use for storage.

Figure 3A:
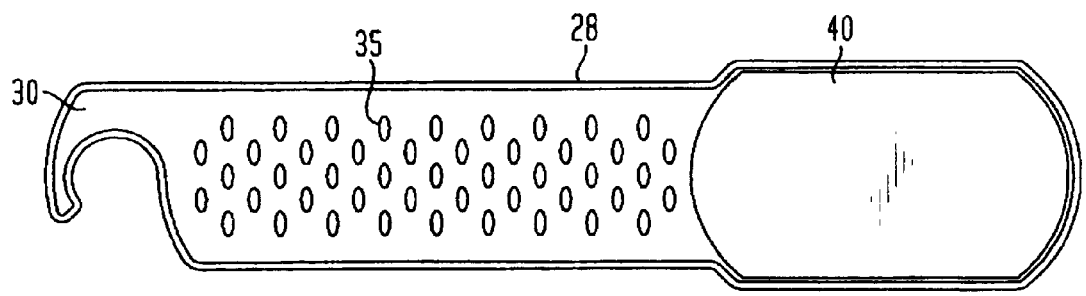
FIG. 3A is a top view of one embodiment of the utensil holder with the holding member comprising a rectangular shelf member.
Figure 3B:
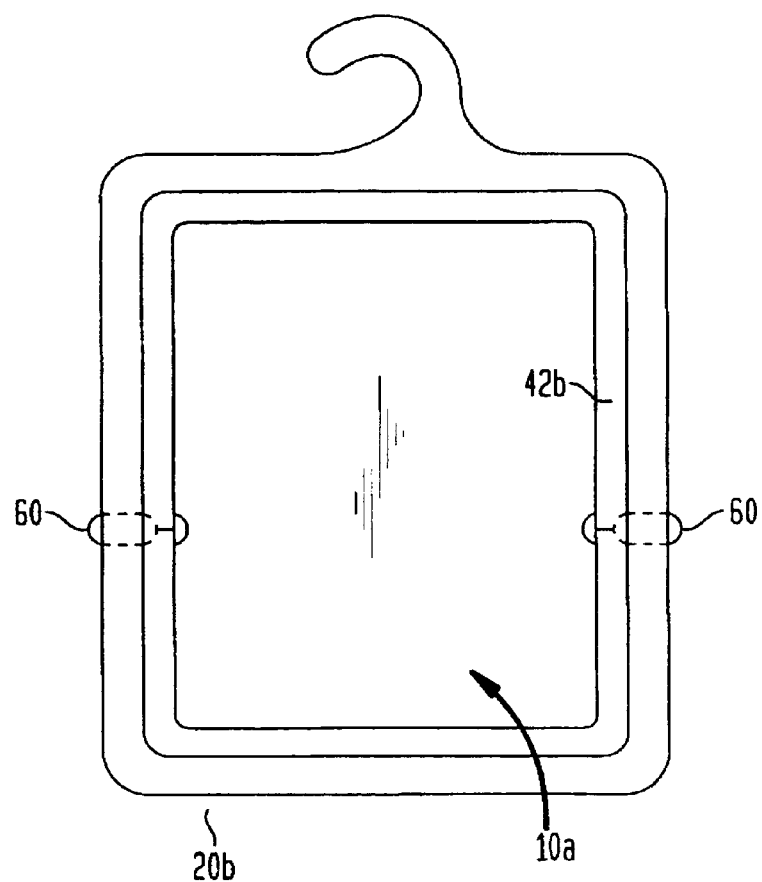
FIG. 3B is a top view of an alternative embodiment of the utensil holder with the holding member comprising a substantially square frame.
Figure 3C:
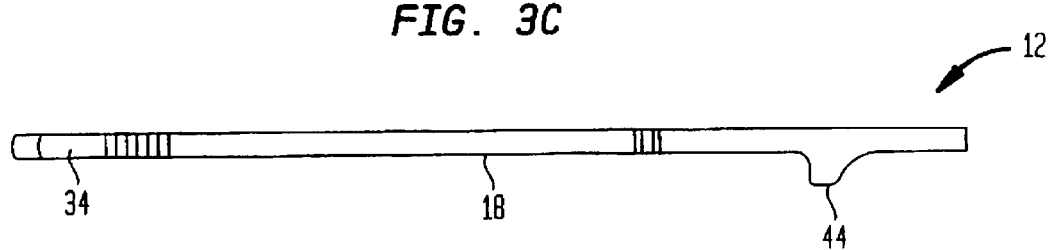
FIG. 3C is a side view of one embodiment of the utensil holder with the holding member comprising a shelf member.
Figure 3D:
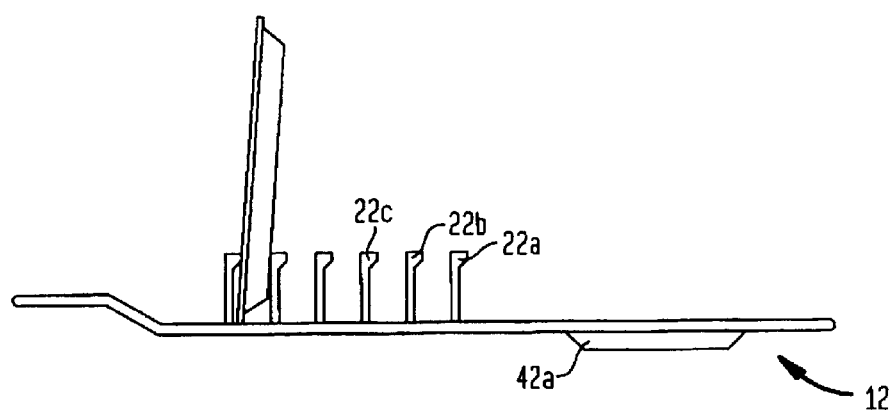
FIG. 3D is a side view of an alternative embodiment of the utensil holder with the holding member comprising a shelf member shown together with a dish rack and dish.

Referring to FIGS. 3A–3E, there are shown top views (FIG. 3A and 3B) and three side views (FIGS. 3C–3E), illustrating various alternative embodiments of the inventive apparatus. As seen in FIG. 3A, the holding member may have a paddle portion 40 at one end for receiving a kitchen implement such as a cutting board. As shown in FIG. 3D, the paddle portion 40 may comprise a depression 42a corresponding in dimension to a cutting board, so that when the board is placed in the depression, it will be retained on the holding member without shifting its position. Alternatively, as shown in FIG. 3B, the holder member may comprise a frame having an aperture 10a therein. In this way, a dish pan can be suspended within the frame. A depressed lip 42b may encircle the aperture for retaining a cutting board within the frame. FIG. 3B also shows use of hinges for reducing the size of the apparatus, e.g., for storage, or for resting the end 20b against the bottom surface of the sink.

Figure 3E:
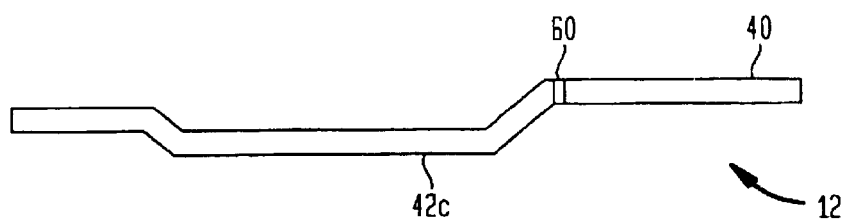
FIG. 3E is a side view of an alternative embodiment of the utensil holder with the holding member comprising a shelf member.

As seen in FIG. 3C, the support surface 12 (FIG. 1) may include a stopper 44 extending downwardly from the bottom surface 18 of the holding member so that when the apparatus 8 is engaged on the sink, the support surface is secured in place against kitchen sink edge 54 (shown in FIG. 2). The stopper helps to stabilize the apparatus, although it may make it more difficult to swivel the device (e.g. FIG. 2). As shown in FIG. 3E, a depression 42c alternatively may be disposed in the mid-section of the holding member. Also in FIG. 3E, a hinge 60 is shown disposed along the holding member for reducing its length for storage or resting against the sink bottom surface.

Figure 4A:
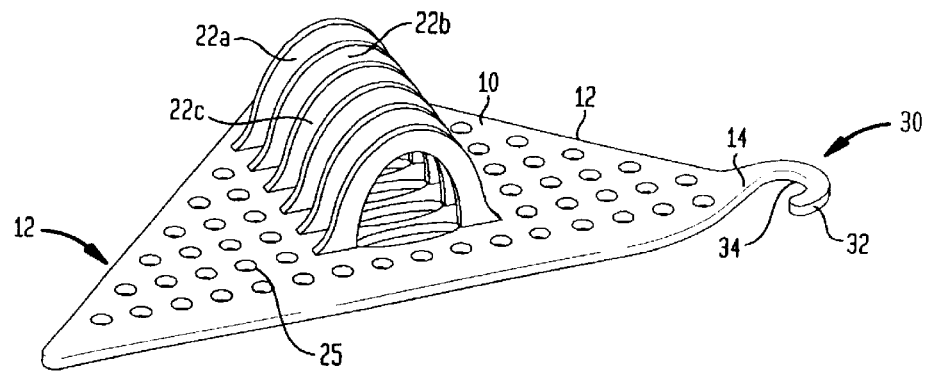
FIG. 4A is a perspective view of an embodiment of the utensil holder with the holding member comprising a triangular shelf member.
Figure 4B:
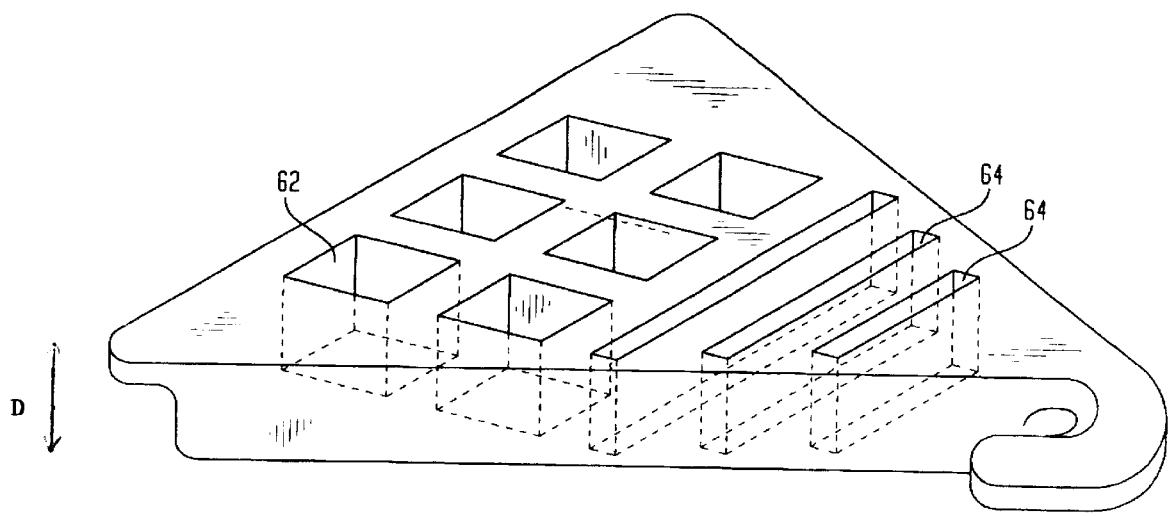
FIG. 4B is a perspective view of an alternative embodiment of the utensil holder with the holding member comprising a triangular shelf member.
Figure 5:
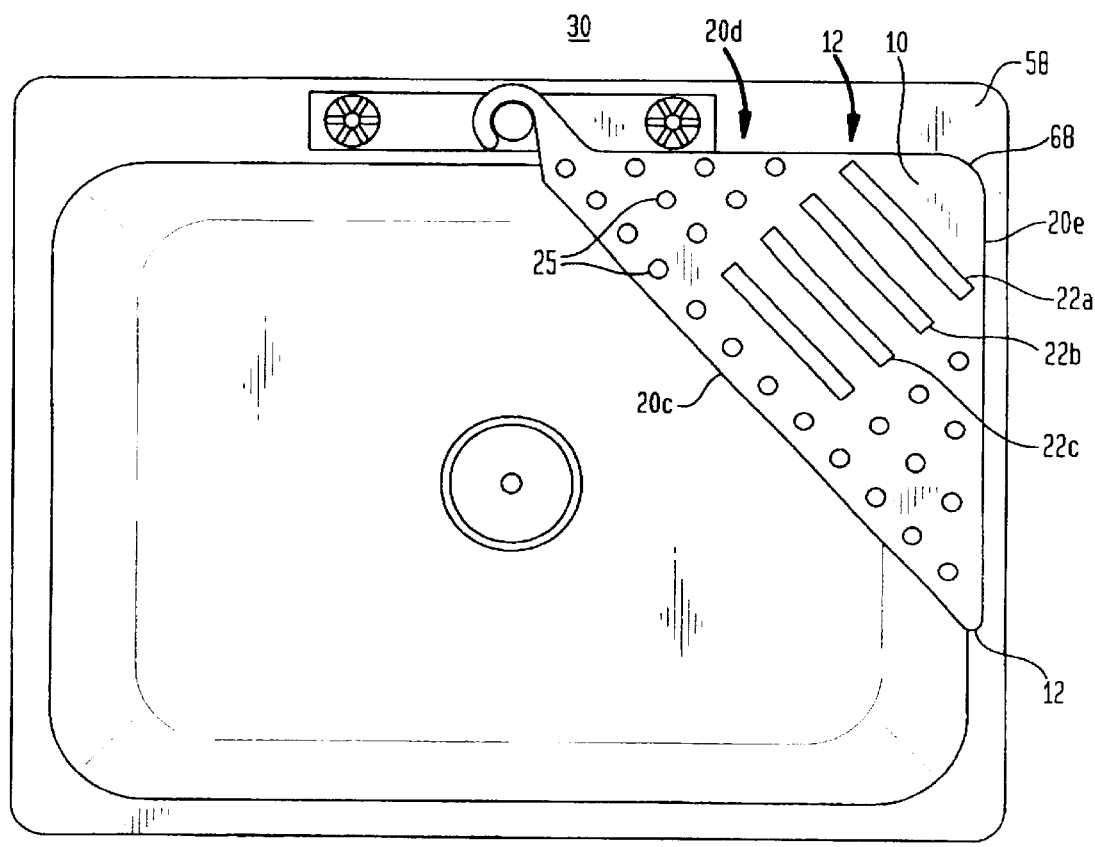
FIG. 5 is a top view of the utensil holder of FIG. 4A shown on a sink.

Referring to FIGS. 4A, 4B and 5, there is shown an alternative embodiment of the invention wherein the holding member comprises a triangular-shaped shelf member 10. FIG. 4A shows semi-circular projections defining a dish rack 22a, 22b, 22c, that are integrally formed in the top surface of the holding member. FIG. 4B illustrates a container 62 integrally formed in the surface of the holding member. Such a container may be configured by providing depth to the member (shown by arrow D of FIG. 4B) and openings in the surface of the holding member (the container 62 is shown by the hatched lines). The extended depth "D" need not extend for the entire width of the device (as shown) but may surround only the containers or utensil holders configured therein. A dish rack likewise may be comprised of slots 64 in the member, as opposed to upwardly extending projections as previously shown. As can be seen in FIG. 5 (presenting a top view), the triangular shelf member is configured to rest on the sink edge proximal its corner 58. Therefore, with this embodiment the holding-member has three end portions 20c, 20d, and 20e, and the support surface 12 is disposed at the end portions (20d, 20e) of the holding member converging at the vertex 68 of the triangular member. The inventive apparatus is advantageously fabricated from plastic, e.g., polyethylene, polypropylene, styrene, nylon, and copolymers, but it also could be fabricated from other materials such as metals or woods.

It is understood that the embodiments described herein are merely exemplary and that a person skilled in the art may make variations and modifications without departing from the spirit and scope of the invention. All such variations and modifications are intended to be included within the scope of the appended claims.

I claim:

1. An apparatus for suspending one or more items selected from the group consisting of utensils, implements and food above the bottom surface of a sink between the sink faucet and an edge of the sink, the apparatus comprising:

an elongated holding member for retaining the one or more items, the holding member having a bottom surface and a top surface, each of the top and bottom surfaces being aligned along planes substantially parallel to each other to define a substantially planar holding member, at least a first end portion and a second end portion, wherein the bottom surface at the second end portion is substantially flat and extends laterally outward from the first end to provide a support surface for resting against an edge of the sink, wherein the periphery of the holding member comprises a ridge having at least one recess therein so that one or more removable kitchen implement having an extension with an outer dimension corresponding to the at least one recess may be secured on the holding member by snap-fitting the extension on each of the one or more removable kitchen implements into the at least one recess; and a stabilizer extending outwardly from the first end portion of the holding member, the stabilizer having an inner arcuate surface disposed in spaced-apart relation from the first end portion and defining a faucet contact surface for engaging the back of the sink faucet, wherein when the stabilizer is engaged on the sink faucet, the support surface may rest against a portion of the edge of the sink with the force of gravity pressing the support surface against the edge of the sink so that the stabilizer in cooperation with the support surface and the force of gravity maintain the holding member above the bottom surface of the sink, whereby when the stabilizer is engaged on the sink faucet, the holding member may be moved from a first position relative to the bottom of the sink to a second position without being lifted in an upwardly direction.

2. The apparatus of claim 1, wherein the holding member comprises a frame having an inner aperture.

3. The apparatus of claim 1, in which the holding member further has a stopper extending downwardly from the bottom surface.

4. The apparatus of claim 1, wherein the holding member has a plurality of projections extending upwardly from its top surface.

5. The apparatus of claim 4, wherein the plurality of projections are removably disposed on the holding member.

6. The apparatus of claim 4, wherein the plurality of projections are integrally formed in the holding member.

7. The apparatus of claim 1, wherein the holding member is triangular in shape.

8. The apparatus of claim 1, wherein the holding member has a plurality of apertures extending through the top and bottom surfaces of the holding member.

9. The apparatus of claim 1, wherein the holding member comprises a depression.

10. An apparatus for holding items above the bottom surface of a sink, the apparatus comprising:

an elongated holding member for retaining a plurality of items, the holding member having a top surface, a bottom surface, a first end, and a second end, wherein the bottom surface at the second end is substantially flat and extends laterally outward from the first end to define a support surface for resting against an edge of the sink, and the top surface has at least one substantially L-shaped ridge defining a a notch therein adapted to receive a corresponding extension disposed on a kitchen implement so that the kitchen implement may be removably secured to the holding member by snap-fitting the extension on the kitchen implement into the notch in the at least one ridge; and a stabilizer extending outwardly from the first end of the holding member and having an inner arcuate surface disposed in spaced-apart relation from the first end, wherein the inner arcuate surface defines a faucet contact surface for engaging the back of a sink faucet, wherein when the stabilizer is disposed on the sink faucet the support surface rests against a portion of the sink with the force of gravity pressing the support surface against a portion of the sink so that the stabilizer in cooperation with the support surface and the force of gravity maintain the holding member above the bottom surface of the sink.

11. The apparatus of claim 10, wherein the holding member is fabricated in a shape selected from triangular and rectangular shapes.

12. The apparatus of claim 10, wherein the holding member has a plurality of apertures extending through the holding member from the top to the bottom surfaces.

* * * * *